United States Patent
Rosner et al.

(10) Patent No.: US 12,085,642 B2
(45) Date of Patent: Sep. 10, 2024

(54) SYSTEM AND METHOD FOR ORBITAL COLLISION SCREENING

(71) Applicant: LeoLabs, Inc., Menlo Park, CA (US)

(72) Inventors: Christopher Joshua Rosner, Redwood City, CA (US); Michael James Nicolls, Portola Valley, CA (US)

(73) Assignee: LEOLABS, INC., Menlo Park, CA (US)

( * ) Notice: Subject to any disclaimer, the term of this patent is extended or adjusted under 35 U.S.C. 154(b) by 547 days.

(21) Appl. No.: 17/357,161

(22) Filed: Jun. 24, 2021

(65) Prior Publication Data
US 2021/0405187 A1     Dec. 30, 2021

Related U.S. Application Data

(60) Provisional application No. 63/043,368, filed on Jun. 24, 2020.

(51) Int. Cl.
*G01S 13/933*     (2020.01)
*B64G 1/24*     (2006.01)
(Continued)

(52) U.S. Cl.
CPC ............ *G01S 13/933* (2020.01); *B64G 1/242* (2013.01); *B64G 1/52* (2013.01); *B64G 1/66* (2013.01)

(58) Field of Classification Search
CPC ......... G01S 13/933; B64G 1/242; B64G 1/52; B64G 1/66; B64G 3/00; G05D 1/10
See application file for complete search history.

(56) References Cited

U.S. PATENT DOCUMENTS

| | | | | |
|---|---|---|---|---|
| 5,301,284 A | * | 4/1994 | Estes | G06T 17/00 |
| | | | | 715/966 |
| 5,867,804 A | * | 2/1999 | Pilley | G01S 19/14 |
| | | | | 342/36 |

(Continued)

OTHER PUBLICATIONS

Mirtich Brian, "Efficient Algorithm for Two-Phase Collision Detection," TR-97-23, A Mitsubishi Electric Research Laboratory, Dec. 1, 1997, http://www.merl.com (26 Pages).

(Continued)

*Primary Examiner* — Donald J Wallace
*Assistant Examiner* — Jalal C Coduroglu
(74) *Attorney, Agent, or Firm* — Dentons US LLP

(57) ABSTRACT

A method for orbital collision screening comprising, obtaining trajectory information of a plurality of objects moving on predictable paths. For each one of the plurality of objects, based upon respective trajectory information of the one of the plurality of objects, computing, a respective spatial descriptor of the path of the one of the plurality of objects, and storing the respective spatial descriptors of each of the plurality of objects in a data structure. Subsequently obtaining trajectory information of a further object, and based upon the trajectory information of the further object, computing a spatial descriptor of the path of the further object. Making first comparisons of the spatial descriptor of the further object against the respective spatial descriptors of each of the plurality of objects stored in the data structure to determine whether each of these first comparisons indicates a possible collision risk. Based upon each of the first comparisons, if the first comparison indicates a possible collision risk, determining a result of a close approach determination between the respective trajectory information of the respective one of the plurality of objects and the trajectory information of the further object, and taking an (Continued)

action based on result of the close approach determination satisfying a predetermined threshold.

39 Claims, 4 Drawing Sheets

(51) Int. Cl.
    *B64G 1/52*     (2006.01)
    *B64G 1/66*     (2006.01)

(56) References Cited

U.S. PATENT DOCUMENTS

| | | | | |
|---|---|---|---|---|
| 5,960,097 | A * | 9/1999 | Pfeiffer | G06V 10/255 |
| | | | | 342/357.65 |
| 6,102,334 | A * | 8/2000 | Claffey | B64G 1/242 |
| | | | | 244/171.3 |
| 2001/0043722 | A1* | 11/2001 | Wildes | G06V 40/20 |
| | | | | 382/107 |
| 2010/0049440 | A1* | 2/2010 | Alfano | G08G 9/02 |
| | | | | 701/301 |
| 2012/0206494 | A1* | 8/2012 | Sahr | G06F 16/29 |
| | | | | 345/660 |
| 2013/0292517 | A1* | 11/2013 | Briskman | G01S 13/72 |
| | | | | 244/158.8 |
| 2014/0052293 | A1* | 2/2014 | Bruemmer | G06N 7/01 |
| | | | | 700/255 |
| 2014/0278210 | A1* | 9/2014 | Krauss | G01B 21/04 |
| | | | | 702/150 |
| 2016/0334505 | A1* | 11/2016 | Naruse | G01S 15/931 |
| 2017/0096242 | A1* | 4/2017 | Alfano | B64G 3/00 |
| 2018/0082436 | A1* | 3/2018 | Hattori | G06T 1/60 |
| 2018/0082438 | A1* | 3/2018 | Simon | G06T 7/74 |
| 2018/0218619 | A1* | 8/2018 | Brown | G08G 5/0013 |
| 2018/0232947 | A1* | 8/2018 | Nehmadi | G01S 7/295 |
| 2019/0039609 | A1* | 2/2019 | Wood | B60W 60/0015 |
| 2019/0280763 | A1* | 9/2019 | Smyth | H04B 7/18513 |
| 2021/0089040 | A1* | 3/2021 | Ebrahimi Afrouzi | |
| | | | | A47L 9/2873 |
| 2021/0188320 | A1* | 6/2021 | Kim | H04W 4/024 |
| 2022/0081132 | A1* | 3/2022 | Mukae | B64G 3/00 |

OTHER PUBLICATIONS

International Search Report from PCT/US2021/038715 dated Oct. 6, 2021.
Written Opinion of the ISA from PCT/US2021/038715 dated Oct. 6, 2021.

* cited by examiner

SYSTEM AND METHOD FOR ORBITAL COLLISION SCREENING

This application claims the benefit of U.S. Provisional Application No. 63/043,368 filed on Jun. 24, 2020, the contents of which are all hereby incorporated by reference herein in their entirety.

The present application relates to a system and method for orbital collision screening, in particular for artificial satellites.

BACKGROUND

When launching or operating an artificial satellite it is important to be able to identify and determine the risk of collision between the satellite and other objects orbiting in space.

This may be done by calculating and predicting the future positons over time of the artificial satellite and of other space objects, and comparing these future positions at different times. However, in practice it is difficult to do this in a near real time and economic manner because of the very large amount of computation required to calculate and compare the future positions at the resolution required for accurate determination of collision risk. This is particularly a problem when the calculations are being performed for a large number of orbiting space objects. Maintaining a catalog of all objects in low-Earth orbit requires performing such screenings multiple times per day for tens to hundreds of thousands of objects.

Accordingly, it is desirable to reduce the amount of computation required to identify and determine the risk of collision between different objects orbiting in space.

The embodiments described below are not limited to implementations which solve any or all of the disadvantages of the known approach described above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method is provided for orbital collision screening.

In a first aspect, the present disclosure provides a computer implemented method comprising: obtaining trajectory information of a plurality of objects moving on predictable paths; for each one of the plurality of objects, based upon respective trajectory information of the one of the plurality of objects, computing a respective spatial descriptor of the path of the one of the plurality of objects; storing the respective spatial descriptors of each of the plurality of objects in a data structure; and subsequently: obtaining trajectory information of a further object; based upon the trajectory information of the further object, computing a spatial descriptor of the path of the further object; making first comparisons of the spatial descriptor of the further object against the respective spatial descriptors of each of the plurality of objects stored in the data structure to determine whether each of these first comparisons indicates a possible collision risk; and based upon each of the first comparisons: if the first comparison indicates a possible collision risk, determining a result of a close approach determination between the respective trajectory information of the respective one of the plurality of objects and the trajectory information of the further object; and taking an action based on result of the close approach determination satisfying a predetermined threshold.

In a second aspect, the present disclosure provides a system comprising: a memory having computer executable instructions therein; and at least one processor, the computer executable instructions, when executed by the at least one processor, cause the one or more processors to: obtain trajectory information of a plurality of objects moving on predictable paths; for each one of the plurality of objects, based upon respective trajectory information of the one of the plurality of objects, compute a respective spatial descriptor of the path of the one of the plurality of objects; store the respective spatial descriptors of each of the plurality of objects in a data structure; and subsequently: obtain trajectory information of a further object; based upon the trajectory information of the further object, compute a spatial descriptor of the path of the further object; making first comparisons of the spatial descriptor of the further object against the respective spatial descriptors of each of the plurality of objects stored in the data structure to determine whether each of these first comparisons indicates a possible collision risk; and based upon each of the first comparisons: if the first comparison indicates a possible collision risk, determine a result of a close approach determination between the respective trajectory information of the respective one of the plurality of objects and the trajectory information of the further object; and take an action based on result of the close approach determination satisfying a predetermined threshold.

In a third aspect, the present disclosure provides a tangible non-transitory computer-readable storage medium having computer readable instructions stored therein which, when executed by one or more processors, cause the one or more processors to: obtain trajectory information of a plurality of objects moving on predictable paths; for each one of the plurality of objects, based upon respective trajectory information of the one of the plurality of objects, compute a respective spatial descriptor of the path of the one of the plurality of objects; store the respective spatial descriptors of each of the plurality of objects in a data structure; and subsequently: obtain trajectory information of a further object; based upon the trajectory information of the further object, compute a spatial descriptor of the path of the further object; making first comparisons of the spatial descriptor of the further object against the respective spatial descriptors of each of the plurality of objects stored in the data structure to determine whether each of these first comparisons indicates a possible collision risk; and based upon each of the first comparisons: if the first comparison indicates a possible collision risk, determine a result of a close approach determination between the respective trajectory information of the respective one of the plurality of objects and the trajectory information of the further object; and take an action based on result of the close approach determination satisfying a predetermined threshold.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
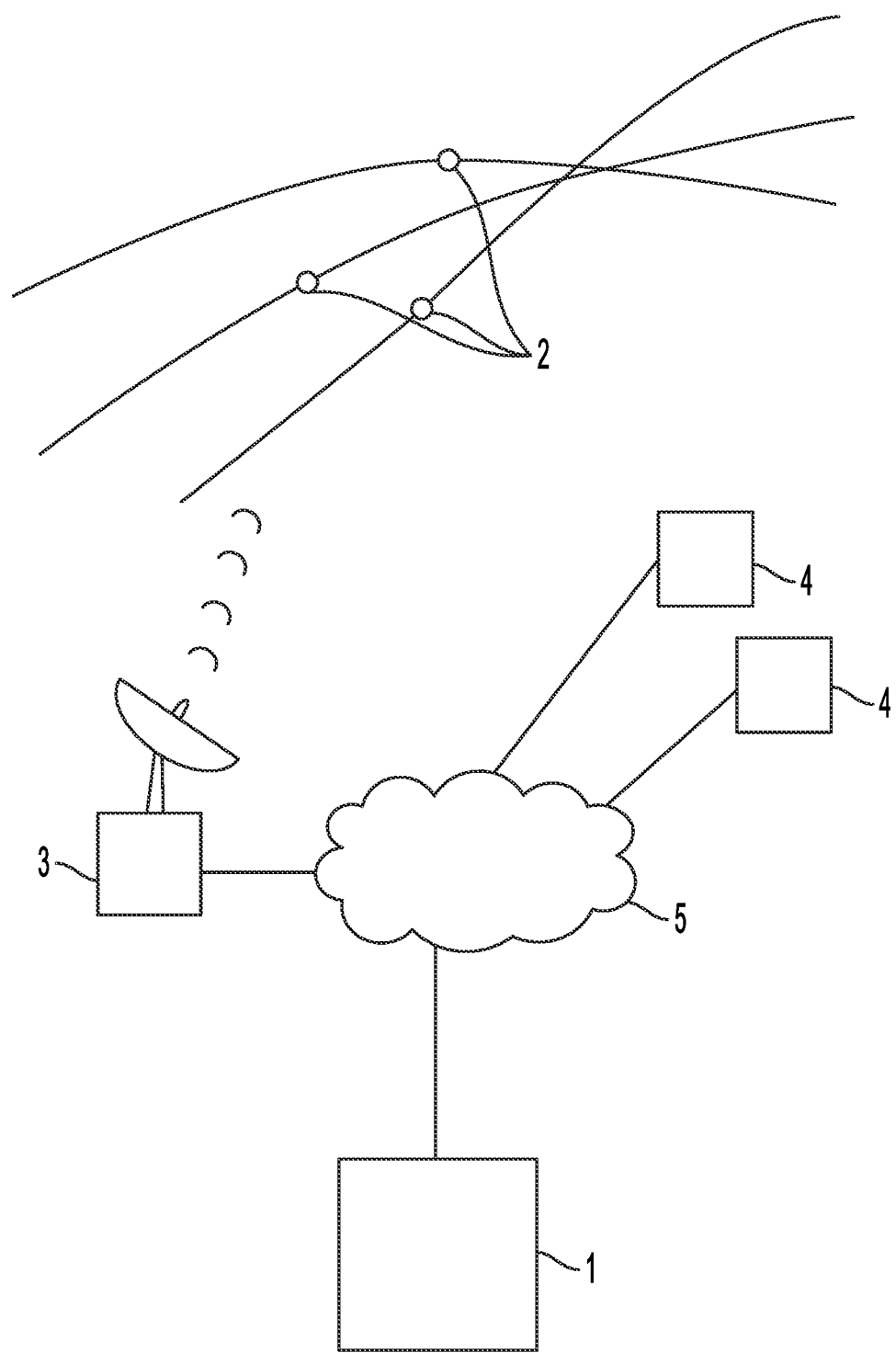
FIG. 1 is an explanatory diagram of an orbital collision warning system according to a first embodiment.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Satellite operators commonly require warnings when one of their satellite(s) is predicted to have a conjunction, where the satellite comes close to another resident space object (RSO). A resident space object is an object orbiting another object, such as a satellite or some other object, such as a piece of space debris, in orbit around the earth. These warnings enable the satellite operators to assess the risk of the upcoming conjunction, and decide whether to take preventive action, such as maneuvering their satellite, and whether to alert a regulator or other authority regarding the risk. Where the other RSO in the conjunction is a satellite, the warnings enable the satellite operator to decide whether to alert the operator of the other satellite, so that the operator of the other satellite can decide whether to take preventive action, and/or so that the two satellite operators can mutually decide on suitable preventive action.

The capacity to identify and analyze conjunctions and possible collision risks may also be useful for other purposes. For example: to understand risk of a satellite mission, for example for insurance risk assessment; to build up actuarial tables, for example to show the risk of a specific satellite, constellation of satellites, or operator of having a collision over a particular time span, such as the lifetime of a satellite; forecasting environmental risk, particularly when collision risks between debris objects are also analyzed; forecasting collision or debris-removal scenarios to understand their impact; complying with licensing requirements for collision risk; for mission planning and optimization; optimization of a scenario, e.g., testing a number of possible ephemerides for a satellite to test and optimize a proposed maneuver.

FIG. 1 shows an explanatory diagram of an example of an orbital collision warning system 1 according to a first embodiment. In the first embodiment of FIG. 1, the orbital collision warning system 1 is provided with trajectory information regarding the movements of RSOs 2 in orbit around the earth from a number of different sources. In this embodiment, the trajectory information is ephemeris information. In other examples the trajectory information may be in other forms or formats. The sources of ephemeris information include a ground based radar station 3, and a number of satellite operators 4. The orbital collision warning system 1 is connected to the ground based radar station 3 and the satellite operators 4 through a telecommunications network 5, such as the Internet. In other examples, the orbital collision warning system 1 may be provided with ephemeris information from other additional, or alternative, sources.

An overview of the operation of the orbital collision warning system 1 is that the orbital collision warning system 1 maintains a record of a number of known RSOs 2 and their movements. The RSOs 2 may, for example, be satellites, space stations, payloads, rocket bodies, or items of space debris. This list is not intended to be exhaustive, and the RSOs 2 may be of other types. Further, the RSOs 2 may be orbiting about a body other than the earth. The orbital collision warning system 1 receives notifications of new RSOs 2 and the ephemeris information describing their movement, and notifications of updated ephemeris information regarding movement of known RSOs 2 which already have a record.

When the orbital collision warning system 1 receives a notification of a new RSO 2, the orbital collision warning system 1 compares the predicted movement over time of the new RSO 2 to the predicted movement over time of all of the known RSOs 2 for which the orbital collision warning system 1 has records, and identifies and determines the risk of collision between the new RSO 2 and the known RSOs 2. The orbital collision warning system 1 also generates and stores a record of the new RSO 2 so that the new RSO 2 is added to the known RSOs 2.

When the orbital collision warning system 1 receives a notification of updated ephemeris information regarding movement of a known RSO 2, the orbital collision warning system 1 compares the new predicted movement over time of this updated RSO 2 to the predicted movement over time of all of the other known RSOs 2 for which the orbital collision warning system 1 has records, and identifies and determines the risk of collision between the updated RSO 2 and the other known RSOs 2. The orbital collision warning system 1 also updates the record of the updated RSO 2 based on the notification.

The ground based radar station 3 may provide notifications of ephemeris information of new RSOs 2 and updated ephemeris information regarding known RSOs 2 derived from radar measurements of the RSOs 2. The ground based radar station 3 may be an individual radar or may be a system comprising multiple radars and arranged to provide ephemeris information based on data from these multiple radars. Satellite operators 4 may provide notifications of new RSOs 2 and updates regarding the movements of known RSOs 2, which RSOs 2 are satellites controlled or operated by the respective satellite operators 4. For example, a satellite operator 4 launching a satellite RSO 2 may issue information regarding the new satellite RSO 2 and its ephemeris information, or a satellite operator maneuvering a satellite RSO 2 may issue information regarding the new ephemeris information of the satellite RSO 2 following the maneuver. Further, a satellite operator 4 intending to launch a satellite RSO 2 may issue information regarding the intended new satellite RSO 2 and its ephemeris information before the satellite RSO 2 is launched, or a satellite operator intending to maneuver a satellite RSO 2 may issue information regarding the new ephemeris information of the satellite RSO 2 following the maneuver before the maneuver is carried out.

Figure 2:
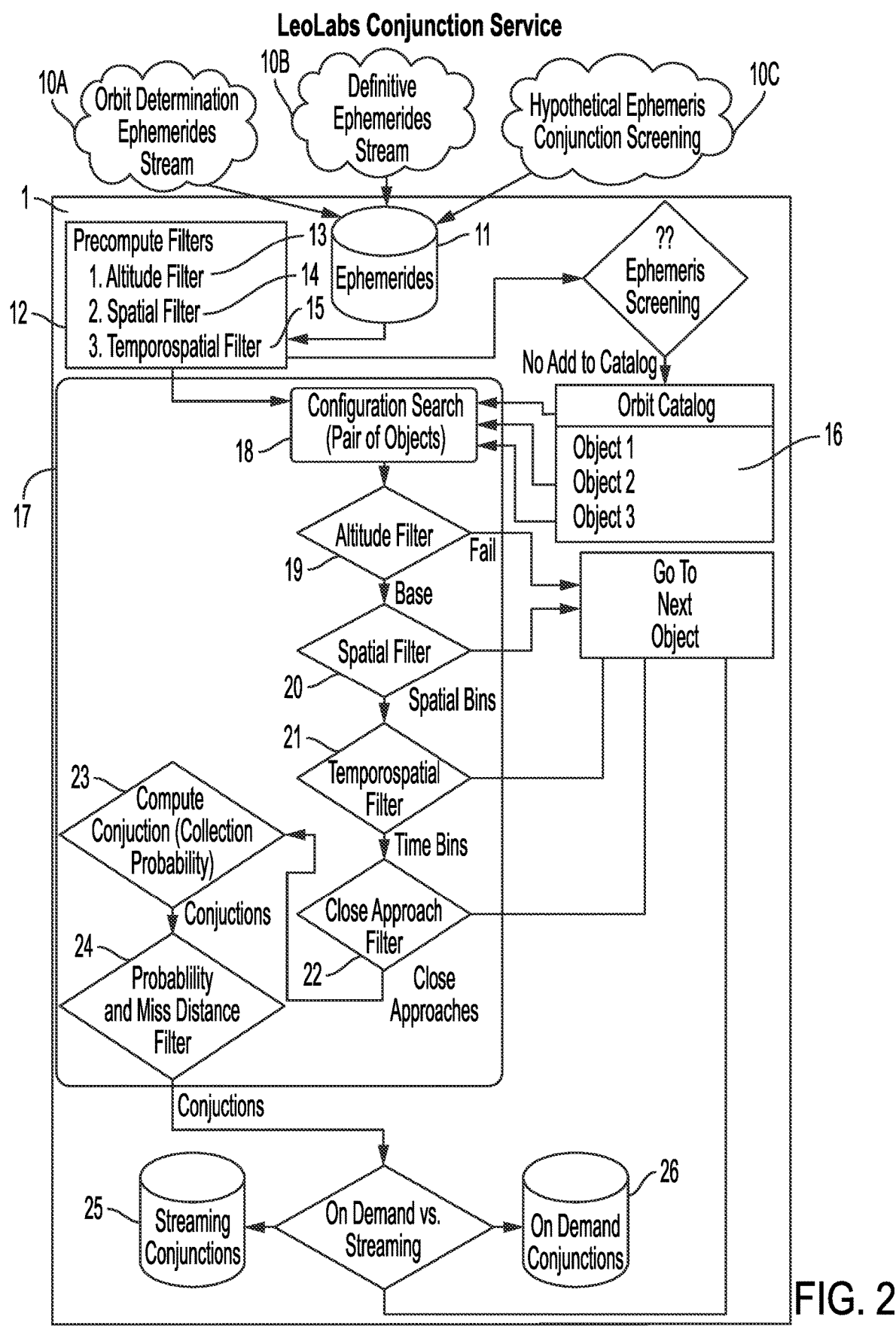
FIG. 2 is an explanatory diagram showing the operation of the orbital collision warning system according to the first embodiment.

FIG. 2 shows an explanatory example of details of the operation of the orbital collision warning system 1 according to the first embodiment.

In operation, the orbital collision warning system 1 receives ephemeris information from the radar station 3 and satellite operators 4 in the form of streams 10a and 10b of ephemeris information messages, with each ephemeris information message relating to an RSO 2.

The ephemeris information message streams 10a and 10b each comprise a series of ephemeris information messages. Each ephemeris information message comprises an identifier portion comprising an identifier of the RSO 2 to which the ephemeris information message relates, and an ephemeris portion comprising an ephemeris or ephemerides for the RSO 2.

An ephemeris of an RSO 2 describes the movement over time of the RSO 2, that is, the position/velocity over time of the RSO 2, together with the uncertainties, or covariances, of these. An ephemeris may be regarded as defining a 6-dimensional propagated state vector of an orbital object. There are a number of known ephemeris formats, and any suitable ephemeris format may be used. Examples of known ephemeris formats include: the STK Ephemeris file format, the CCSDS OEM format, the NASA ephemeris format, the Generic On-Orbit Ephemeris format, the Modified ITC Ephemeris format, the Two-Line Element Set format, and the LeoLabs ephemerides format. This list is not intended to be exhaustive, and other ephemeris formats exist. Further, some formats have multiple versions.

The ephemeris information message stream 10a comprises a series of ephemeris information messages from a radar station 3. The radar station 3 generates the ephemeris information messages by tracking identified RSOs. The radar station 3 measures the position and/or velocity of each tracked RSO 2 over time, propagates state vectors of the tracked RSOs 2, and uses these to derive the ephemerides of the tracked RSOs 2. The radar station 3 then generates ephemeris information messages each comprising the ephemeris of a tracked RSO 2 and its identifier, and sends them to the orbital collision warning system 1. In other examples, the ephemerides of the tracked RSOs 2 and the ephemeris information messages may be generated and sent to the orbital collision warning system 1 by a processing facility using position and velocity measurements from the radar station 3, instead of being generated and sent directly by the radar station 3 itself, or may be generated by a part of the orbital collision warning system 1 using position and velocity measurements from the radar station 3. In such examples the ephemerides and the ephemeris information messages are based on data provided by the radar station 3 and generated elsewhere.

The ephemeris information message stream 10b comprises a series of ephemeris information messages from satellite operators 4. Each satellite operator 4 generates the ephemeris information messages based on tracking information regarding their satellite RSOs 2, which may be obtained by the satellite operator 4 and/or a third party, and commanded maneuvers carried out by their satellite RSOs 2. This tracking information may, for example, be obtained by the satellite operator 4 from GPS position measurements on their satellites. The orbital collision warning system measures and/or predicts the position and/or velocity of their satellite(s) over time, propagates state vectors of the satellite(s), and uses these to derive the ephemeris of the or each satellite. Each satellite operator 4 then generates ephemeris information messages each comprising the ephemeris of a satellite RSO 2 and its identifier, and sends them to the orbital collision warning system 1.

Some satellite operators 4 may be clients or customers of the orbital collision warning system who wish to have warnings and/or information regarding any collision risk to their satellite(s). Some satellite operators 4 may make ephemeris information regarding their satellite(s) available to the public, for example to assist other satellite operators to avoid collisions with them.

When an ephemeris information message is received along one of the ephemeris information message streams 10a and 10b the orbital collision warning system 1 places the ephemeris information message in a received message store 11 until the orbital collision warning system 1 is ready to process the ephemeris information message. In general, the ephemeris information messages are sent asynchronously and independently by the radar station 3 and the different satellite operators 4, so that the orbital collision warning system 1 cannot predict when the ephemeris information messages will be received. Accordingly, the received message store 11 acts as an input buffer for the orbital collision warning system 1, and the number of ephemeris information messages stored in the received message store 11 may vary over time.

The orbital collision warning system 1 processes each ephemeris information message stored in the received message store 11 to extract the ephemeris information and then processes the extracted ephemeris information in a precomputing operation 11 to precompute a number of descriptors of the current RSO to which the processed ephemeris information message relates. Each descriptor is a dimensionally reduced descriptor of the movement over time of the current RSO according to the ephemeris information.

In the illustrated embodiment of FIG. 2, the precomputing operation 12 precomputes three descriptors of the current RSO 2, an altitude descriptor 13, a spatial descriptor 14, and a temporospatial descriptor 15 for a period extending one day into the past and seven days into the future. In other examples only one, or some, of these descriptors 13 to 15 may be used. In some examples, different descriptors may be used instead of, or in addition to, the descriptors 13 to 15.

In the illustrated embodiment of FIG. 2 the descriptors are generated for a period extending one day into the past to produce additional look back data regarding conjunctions which have already occurred, which may be useful in some situations. Further, the descriptors are generated for a period extending seven days into the future because this is a typical period of interest for satellite operators to examine possible future conjunctions. In principle, the period covered by the descriptors could be any desired period into the past or the future, for example 30 days, or a year. However, in practice the uncertainties can grow large for longer periods of time beyond seven days.

The orbital collision warning system 1 comprises an orbit catalog 16, which is a data structure storing information regarding known RSOs. For each known RSO the orbit catalog 16 contains a record for that RSO comprising an identifier of the RSO stored in association with the three precomputed descriptors of the RSO and the ephemeris of the RSO. The orbit catalog 16 may be provided by a data storage device.

If the current RSO to which the ephemeris information message being processed relates is a new RSO, the orbital collision warning system 1 generates and stores a new record for the current RSO in the orbit catalog 16. The new record comprises the identifier of the current RSO stored in association with the three precomputed descriptors 13 to 15 of the current RSO and the ephemeris of the current RSO.

Alternatively, if the current RSO to which the ephemeris information message being processed relates is a known RSO which already has a record in the orbit catalog 16, the orbital collision warning system 1 updates the record for this known RSO in the orbit catalog 16. The record for the known RSO is updated to include the three new precomputed descriptors 13 to 15 of the current RSO and the new ephemeris of the current RSO derived from the processed ephemeris information message. In some examples the updating may simply overwrite or replace previous values so that each record in the orbit catalogue 16 includes only a single most up to date set of precomputed descriptors 13 to 15 and ephemeris for the known RSO. In other examples some, or all previous values may also be stored. In such examples the stored previous values may be used, for example, to carry out historical conjunction searches and collision risk assessments for conjunctions which have already occurred.

The orbital collision warning system 1 may determine whether the current RSO is a new RSO or a known RSO by comparing the identifier comprised in the current ephemeris information message with the identifiers of known RSOs which have a record in the orbit catalog 16.

In the illustrated embodiment of FIG. 2, it is assumed that an updated ephemeris for each known RSO stored in orbit catalog 16 will be received before the end of the seven day future period of the precomputed descriptors 13 to 15, for example from the radar station 3. Without wishing to be bound by theory, it is expected that if a known RSO is not detected and tracked within seven days it is no longer present in the monitored orbital space. For example, the RSO may have deorbited or maneuvered to an orbital path outside the monitored orbital volume, or may have experienced a maneuver, collision or other event which renders it unrecognizable, so that it has been identified as a new RSO. In other examples a different period of the precomputed descriptors may be used. In other examples RSOs for which an updated ephemeris is not received within a predetermined period may have their precomputed descriptors recalculated so that they do not reach the end of their precomputed descriptors.

After the precomputing operation 11, the orbital collision warning system 1 carries out a conjunction search operation 17 to determine whether there are any conjunctions having a predetermined characteristic, such as a risk of collision, between the current RSO and any of the other known RSOs having records in the orbit catalog 16.

The conjunction search operation 17 comprises a series of conjunction searches 18, and each conjunction search 18 determines whether there is any risk of collision between a single pair of objects comprising the current RSO and a different one of the other known RSOs having a record in the orbit catalog 16. There may be more than one conjunction between a current RSO and specific one of the other known RSOs during the time period covered by their respective precomputed descriptors 13 to 15. Accordingly, each conjunction search 18 may determine whether there is any risk of collision over one or more conjunctions.

The conjunction search operation may be carried out by a computing instance of the orbital collision warning system 1. The computing instance may, for example, be provided by a memory having computer executable instructions therein and at least one processor to execute the computer executable instructions. The computing instance may, for example, be provided by a cloud based computing environment. In some examples the computing instance may be provided by CPUs, or may be provided at a lower level by GPUs or FPGAs. The computing instance may be provided by a single computing system, or may be provided by a distributed computing system. In a preferred example the computing instance is provided by a cloud based distributed computing system.

Each conjunction search 18 begins with a series of filter operations 19 to 21 in which the precomputed descriptors 13 to 15 of the current RSO are compared to the precomputed descriptors 13 to 15 of one of the other known RSOs stored in the orbit catalog 16.

First, in an altitude filter operation 19 the precomputed altitude descriptor 13 of the current RSO is compared to the stored precomputed altitude descriptor 13 of a known RSO.

In the illustrated embodiment the precomputed altitude descriptor 13 of an RSO comprises the apogee (highest altitude) and perigee (lowest altitude) values of the orbit of the RSO. The apogee and perigee of the orbit of an RSO are calculated from the ephemeris of the RSO in the precomputing operation 11. The apogee and perigee of the orbit of an RSO can be readily calculated from the ephemeris of the RSO using well known procedures, which do not need to be described in detail herein. It will be understood that the precomputed altitude descriptor 13 relates to the single dimension of height, and so is dimensionally reduced from the full 6-dimensional propagated state vector of the RSO defined by an ephemeris.

The altitude filter operation 19 compares the apogee value of the precomputed altitude descriptor 13 of the current RSO to the perigee value of the precomputed altitude descriptor 13 of the known RSO to determine the difference between them, and compares the perigee value of the precomputed altitude descriptor 13 of the current RSO to the apogee value of the precomputed altitude descriptor 13 of the known RSO to determine the difference between them. The altitude filter operation 19 then compares the two determined differences to a 100 km screening distance threshold.

If either of the determined differences is less than 100 km the altitude filter operation 19 is passed, there is considered to be a possible risk of collision between the current RSO and the known RSO, and the conjunction search 18 continues. This possible risk of collision may correspond to one or more conjunctions over the time span of the precomputed altitude descriptors. Alternatively, if neither of the determined differences is less than 100 km the altitude filter operation 19 is failed, there is considered to be no risk of collision between the current RSO and the known RSO, and the conjunction search 18 is ended. The conjunction search operation 17 then begins a new conjunction search 18 for another known RSO.

The altitude filter operation 19 rejects known RSOs where the apogees and perigees of the current RSO and the known RSO indicate that they will not come within the screening distance of 100 km of one another. The altitude filter has a high rejection rate, generally around 70%, of RSO pairs.

An example of code of an algorithm for performing the altitude filter operation 19 is:

```
function altitude_filter(object1, object2)
    if object1.apogee < object2.perigee - 100km; return false
    if object1.perigee > object2.apogee - 100km; return false
    return true
```

Where: object 1 and object 2 are the current RSO and known RSO; a return of false indicates failure of the altitude filter operation; a return of true indicates passing the altitude filter operation.

The run time complexity of this algorithm is O(1) for each altitude filter operation.

It will be understood that if the perigees and apogees of the orbits of two objects are separated by 100 km the two objects cannot collide regardless of the orbital geometry of their orbits. Accordingly, the altitude filter operation 19 can filter out known RSOs which pose no collision risk to a current RSO.

If the altitude filter operation 19 is passed, the conjunction search 18 continues to a spatial filter operation 20. The spatial filter operation 20 operates on the orbital geometry of the current RSO and the known RSO, and uses the precomputed spatial descriptors 14 of the current RSO and the known RSO to limit the volume of space under consideration by mapping the volume of space around the earth onto patches on the surface of a unit-sphere, determining which of these volumes each RSO visits, and comparing which of these volumes the two RSOs both visit, as will be explained in more detail below.

In advance of the operation of the orbital collision warning system 1 a mapping is carried out to map the volume of space surrounding the Earth, described in discrete Cartesian coordinates, onto the surface of a unit sphere (<x,y,z> <x,y,z>/|<x,y,z>|). The discrete Cartesian coordinates may be referred to as Cartesian voxels. The surface of the unit sphere is then divided into 300 substantially equal-area patches by computing a Voronoi diagram for 300 points roughly equally distributed on the surface of the unit sphere using a Fibonacci lattice. The results of the mapping are then stored.

The use of Cartesian coordinates is not essential, in other examples different coordinate systems could be used. In one example spherical coordinates could be used instead of Cartesian coordinates. The use of a unit sphere may simplify calculations. However, the use of a unit sphere is not essential. In other examples different spheres may be used.

The use of 300 patches is not essential, and different numbers may be used in other examples. The number of patches may be selected to optimize performance in any specific implementation. The use of substantially equal-area patches is not essential. In some examples patches having different sizes may be used based on the expected locations where conjunctions are expected to occur. For example, it may be expected that conjunctions between objects in earth orbit are more likely to occur near the poles, as a result of orbital geometries preferred by satellite operators. As a result, in some examples it may be preferred to have different sized patches near to the poles.

Figure 3:
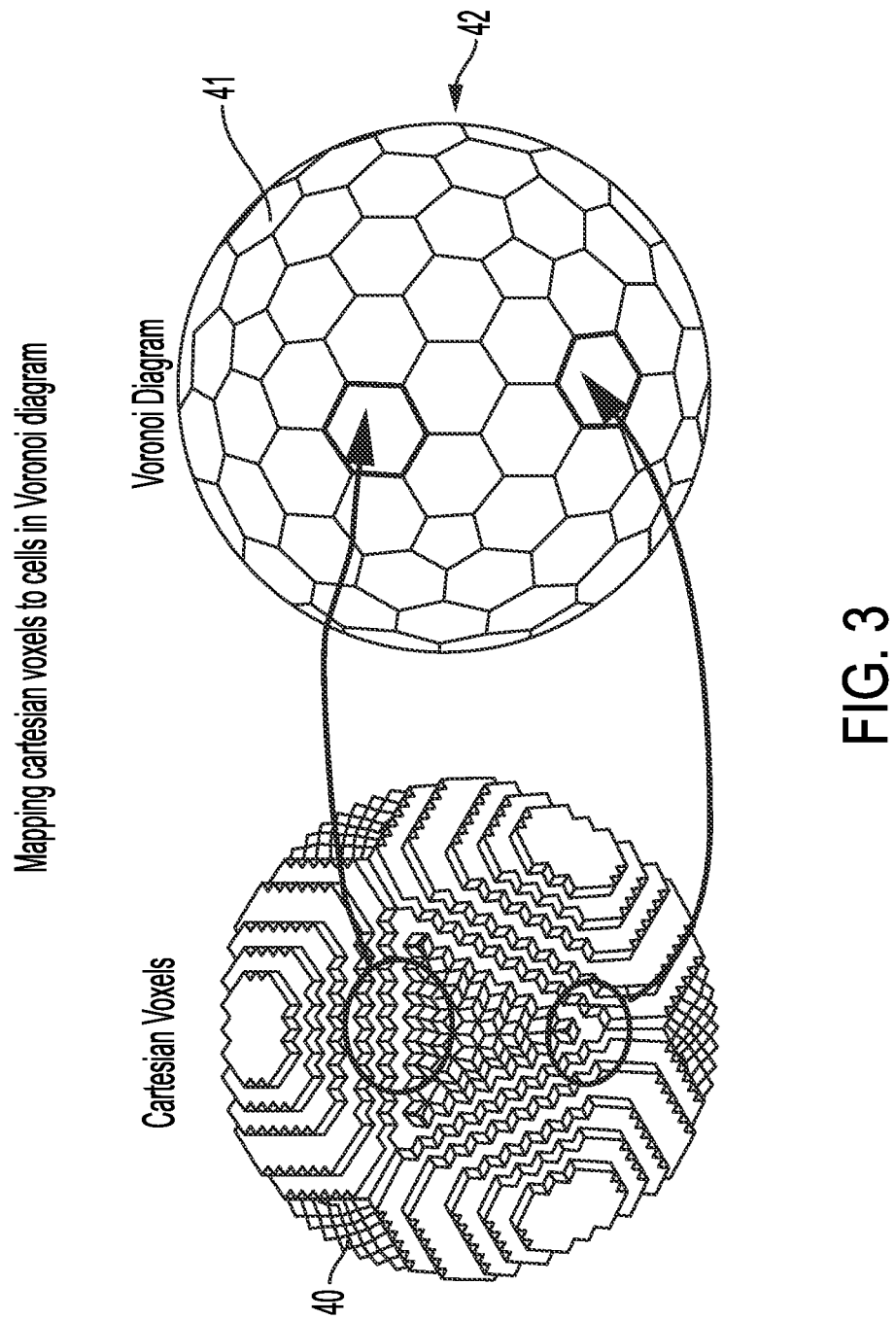
FIG. 3 is an explanatory diagram of a mapping used in the first embodiment.

FIG. 3 shows an explanatory diagram showing an example of a mapping of unit-sphere discretized Cartesian coordinates 40 onto equal-area patches 41 of a Voronoi diagram 42.

It will be understood that the mapping only needs to be carried out once and stored for future use by the orbital collision warning system 1. There is no requirement to repeat the mapping each time the orbital collision warning system 1 is used.

In the precomputing operation 11, in order to compute the spatial descriptor 14 of an RSO the orbital path of an RSO is calculated from its ephemeris. The orbital path of an RSO can be readily calculated from the ephemeris of the RSO using well known procedures, which do not need to be described in detail herein.

The orbital path is then mapped onto the equal-area patches of the Voronoi diagram using the stored mapping and a set of equal-area patches of interest for the RSO is identified. This mapping effectively maps the orbital path to the equal-area patches corresponding to the points on the unit-sphere which the orbital path passes over. Equal-area patches are identified as being of interest for the RSO if another RSO in that equal-area patch could possibly reach a 100 km screening distance of the RSO in a configured time step of 0.5 seconds. This is determined by calculating an interest distance as twice the distance which would be traveled by an object moving at escape velocity in the configured time step plus the 100 km screening distance. It will be understood that since all RSOs must be travelling at below escape velocity two RSOs separated by more that this interest distance cannot possibly come within the 100 km screening distance of one another during a time step. Equal-area patches are then identified as equal-area patches of interest if they lie wholly or partially within the interest distance of the orbital path of the RSO, the distance being measured normal to the orbital path. The spatial descriptor 14 of an RSO comprises the identities of the set of equal-area patches of interest identified for the RSO.

The use of a configured time step of 0.5 seconds is not essential, and configured time steps having different lengths may be used in other examples. As is explained above, if the RSO is anywhere over one patch, the patches of interest are patches which another RSO could be over within some defined length of time (the configured time step) and have a possible collision risk. In general, it is expected that the larger the configured time step, the faster it will be to precompute the spatial descriptor, but that there will be a tradeoff that more patches would have to be considered when carrying out the conjunction search between the different RSOs. The value of the configured time step may be selected to balance the time spent precomputing the descriptors, the time spent evaluating the descriptors at search time, and the memory used when storing the patches of interest for each RSO. A configured time step of 0.5 seconds may provide a good balance between these different factors.

The mapping of the orbital path of an RSO onto the equal-area patches of the Voronoi diagram to produce the spatial descriptor 14 serves as a reduction in dimensionality, removing the altitude and time dimensions, and provides an efficient conjunction filter. This is particularly the case for RSOs in low earth orbit (LEO) because most objects in LEO are in roughly circular orbits, with most LEO RSOs having a difference in altitude between apogee and perigee of less than 200 km. As a result, there is little information of value present in the altitude, or radial, dimension. This is particularly the case in examples where the altitude filter operation 19 is carried out before the spatial filter operation 20.

Figure 4:
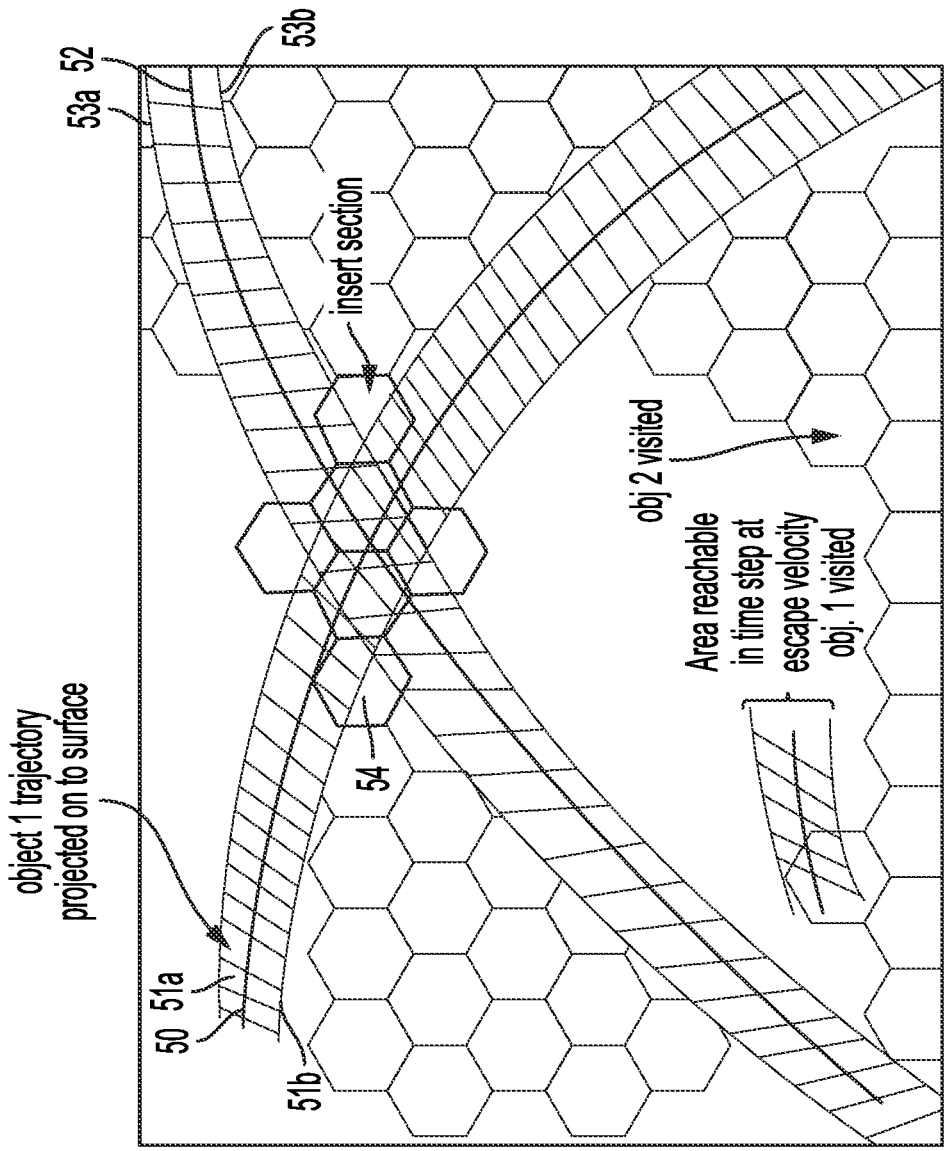
FIG. 4 is an explanatory diagram illustrating mappings and concepts used in a spatial descriptor and a spatial filter operation in the first embodiment.

FIG. 4 shows an explanatory diagram of this mapping process. In FIG. 4, the line 50 indicates the orbital path of the current RSO mapped onto equal-area patches 41. Lines 51a and 51b show the interest distance measured normal to this orbital path, with the lines 51a and 51b being located on opposite sides of the orbital path. Equal-area patches of interest, which lie wholly or partially within the interest distance of the orbital path of the current RSO, measured normal to the orbital path, are equal-area patches 41 which are passed through by any of the lines 50, 51a or 51b in FIG. 4. These equal-area patches are indicated in FIG. 4 by shading with diagonal lines ascending to the left. These equal-area patches are the set of equal-area patches of interest for the current RSO.

Similarly, in FIG. 4, the line 52 indicates the orbital path of the known RSO mapped onto equal-area patches 41. Lines 53a and 53b show the interest distance measured normal to this orbital path, with the lines 53a and 53b being located on opposite sides of the orbital path. Equal-area patches of interest, which lie wholly or partially within the interest distance of the orbital path of the known RSO, measured normal to the orbital path, are equal area patches 41 which are passed through by any of the lines 52, 53a or 53b in FIG. 4. These equal-area patches are indicated in FIG. 4 by shading with diagonal lines descending to the left. These equal-area patches are the set of equal-area patches of interest for the known RSO. The pre-computed spatial descriptor 14 of the known RSO comprises the identities of the set of equal-area patches of interest identified for the known RSO.

In the spatial filter operation 20 a set intersection comparison is made between the set of equal-area patches of the precomputed spatial descriptor 14 of the current RSO and the set of equal-area patches of the stored precomputed spatial descriptor 14 of a known RSO to determine whether any of the identities of their respective sets of equal-area patches match, that is, whether their respective sets of equal-area patches have any equal area patches in common.

If any of the identities of the respective sets of equal-area patches of the current RSO and the known RSO match, the spatial filter operation 20 is passed, there is considered to be a possible risk of collision between the current RSO and the known RSO, and the conjunction search 18 continues. This possible risk of collision may correspond to one or more conjunctions over the time span of the precomputed altitude descriptors Alternatively, if none of the identities of the respective sets of equal-area patches of the current RSO and the known RSO match, the spatial filter operation 20 is failed, there is considered to be no risk of collision between the current RSO and the known RSO, and the conjunction search 18 is ended. The conjunction search operation 17 then begins a new conjunction search 18 for another known RSO.

It will be understood that if the orbital paths of two objects never pass within the 100 km screening distance of one another the two objects cannot collide regardless of their relative positions on their orbits over time, provided that the errors in the positions of the objects are much less than 100 km. Accordingly, the spatial filter operation 20 can filter out known RSOs which pose no collision risk to a current RSO.

In FIG. 4, the group 54 of equal-area patches 41 are the common equal-area patches of interest for both the current RSO and the known RSO which are identified by the set intersection comparison.

The spatial filter operation provides high selectivity in filtering out conjunctions having no collision risk and provides high performance, being able to be carried out quickly without requiring excessive computing resources. This is because it is much faster to carry out set intersection operations than the floating point operations which would be required to compare distances between objects, as is conventionally done to analyze conjunctions.

The run time complexity of the spatial filter operation is O(n), where n is the number of patches used.

In the described embodiment 300 equal-area patches are used. In other examples, a different number of equal-area patches may be used. If too large a number of equal-area patches are used more computing resources are required to carry out the spatial filter operation, for example, more memory is required and more set intersection comparisons are required. If too small a number of equal-area patches are used the equal-area patches are too large, and the selectivity of the spatial filter operation is reduced. Without wishing to be bound by theory, it is believed that about 300 equal-area patches is a good compromise in practice.

If the spatial filter operation 20 is passed, the conjunction search 18 continues to a temporospatial filter operation 21.

In the precomputing operation 11, in order to compute the temporospatial descriptor 15 of an RSO, the times at which the RSO passes within the interest distance of each of the equal-area patches of the set of equal-area patches of interest identified for the RSO is determined. The pre-computed temporospatial descriptor 15 of an RSO comprises the identities of the set of equal-area patches of interest identified for the RSO together with time data identifying the times at which the RSO passes within the interest distance of each of these equal-area patches. It will be understood that because the orbital path is predicted for a plurality of orbits the RSO may pass within the interest distance of a particular equal-area patch at multiple different times. The mapping of the orbital path of an RSO onto the equal-area patches of the Voronoi diagram together with time data to produce the temporospatial descriptor 15 serves as a reduction in dimensionality, removing the altitude dimension.

The timings at which an RSO travels along its orbital path can be readily calculated from the ephemeris of the RSO using well known procedures, which do not need to be described in detail herein.

In the temporospatial filter operation 21, for each of the matching equal-area patches identified as being in the sets of equal-area patches of the precomputed spatial descriptors of both the current RSO and the known RSO, the orbital collision warning system 1 compares the respective times at which each of the current RSO and the known RSO pass within the interest distance of that equal-area patch. The orbital collision warning system 1 uses a set intersection algorithm to identify any time ranges during which both of the RSOs are within the interest distance of the same equal-area patch.

If any time ranges are identified in which both the current RSO and the known RSO are within the interest distance of the same equal-area patch, the temporospatial filter operation 21 is passed, there is considered to be a possible risk of collision between the current RSO and the known RSO, and the conjunction search 18 continues. This possible risk of collision may correspond to one or more conjunctions over the time span of the precomputed altitude descriptors, with each identified time range in which both the current RSO and the known RSO are within the interest distance of the same equal-area patch corresponding to a different conjunction. Alternatively, if no such time ranges are identified, the temporospatial filter operation 21 is failed, there is considered to be no risk of collision between the current RSO and the known RSO, and the conjunction search 18 is ended. The conjunction search operation 17 then begins a new conjunction search 18 for another known RSO It will be understood that if two objects never pass within the interest distance of any common location in a common time range the two objects cannot collide. Accordingly, the temporospatial filter operation 21 can filter out known RSOs which pose no collision risk to a current RSO If the temporospatial filter operation 21 is passed, all of the filter operations 19 to 21 have been passed, and accordingly the conjunction search 18 continues to a close approach filter operation 22.

In the close approach filter operation 22, for each of the time ranges identified in the temporospatial filter operation 21 where the current RSO and the known RSO are within the interest distance of the same equal-area patch, the orbital collision warning system 1 carries out a close approach determination which calculates the minimum separation distance and the timing of the closest approach of the two RSOs during the conjunction using the ephemerides of the current RSO and the known RSO. The timing and separation distance at closest approach between two RSOs during an identified time range can be readily calculated from the ephemerides of the two RSOs using well known procedures, which do not need to be described in detail herein.

For each of the identified time ranges, the orbital collision warning system 1 compares the minimum separation distance between the two RSOs to a 100 km screening distance threshold. If the calculated minimum separation distance between the two RSOs is less than 100 km the close approach filter operation 22 is passed by the conjunction and there is considered to be a possible risk of collision between the current RSO and the known RSO during the conjunction. Alternatively, if the calculated minimum separation distance is not less than 100 km the close approach filter operation 22 is failed by the conjunction and there is considered to be no risk of collision between the current RSO and the known RSO during the conjunction.

If any of the identified time ranges passes the close approach filter operation 22, there is considered to be a possible risk of collision between the current RSO and the known RSO, and the conjunction search 18 continues. Alternatively, if none of the identified time ranges passes the close approach filter operation 22, there is considered to be no risk of collision between the current RSO and the known RSO, and the conjunction search 18 is ended. The conjunction search operation 17 then begins a new conjunction search 18 for another known RSO.

It will be understood that if two objects are separated by over 100 km at their closest approach there is no risk of collision between the two objects for any plausible level of uncertainty in their ephemerides.

If the close approach filter operation 22 is passed, the conjunction search 18 continues to a collision probability operation 23.

In the collision probability operation 23, for each time range passing the close approach filter operation, the orbital collision warning system 1 uses the calculated minimum separation distance and the covariance, or uncertainty, information from the respective ephemerides of the current RSO and the known RSO, together with the known, or estimated sizes, generally referred to as the hard body radius, of the current RSO and the known RSO, to calculate the probability of a collision between the current RSO and the known RSO occurring during the conjunction. In some examples the Mahalanobis distance between the current RSO and the known RSO may also be added.

The orbital collision warning system 1 then carries out a probability and miss distance filtering operation 24. In the probability and miss distance filtering operation 24 the probability of a collision calculated in the collision probability operation 23 is compared to a probability threshold, and the minimum separation distance calculated in the close approach filter operation 22 is compared to a miss distance threshold.

If the result of the comparisons is that the probability of a collision is above the probability threshold, or that the minimum separation distance is below the miss distance threshold, the orbital collision warning system 1 generates a conjunction report including details of the conjunction, and stores this in a conjunction report store 25.

The conjunction report comprises a data package describing the conjunction and its metadata. In some examples, the data package identifies the current RSO and the known RSO which are at risk of colliding, the expected time of the possible collision, and the calculated probability of collision and calculated minimum separation distance. This is not essential, and in other examples the conjunction report may include different information.

When all of the time ranges passing the close approach filter operation have been subject to the collision probability operation 23 and the probability and miss distance filtering operation 24 the conjunction search operation 17 then begins a new conjunction search 18 for another known RSO.

The conjunction search operation 17 is carried out between the current RSO and all other known RSOs, and then ends. Accordingly, at each of the points in the conjunction search operation 17 described above where it is stated that the conjunction search operation 17 begins a new conjunction search 18 for another known RSO, when a conjunction search 18 has been carried out for all known RSOs except for the current RSO itself, the conjunction search operation 17 ends. The orbital collision warning system 1 can then begin processing the next ephemeris information message in the received message store 11.

As is explained above, the orbital collision warning system 1 stores conjunction reports regarding possible collision risks in the conjunction report store 25. In operation of the orbital collision warning system 1, clients or customers may have access to the conjunction report store 25, for example by using an API, in order to allow them to obtain conjunction reports of interest.

In some examples, the orbital collision warning system 1 may provide other services based on the conjunction reports. Examples of possible services include providing a notification service regarding conjunctions, or routines that perform automated actions based on conjunctions that meet specified thresholds.

In some examples, satellite operators who are clients of the orbital collision warning system operator may be able to set their own collision probability threshold and miss distance threshold values for use in generating conjunction reports if one or both of the current RSO and the known RSO are satellites that they operate. These conjunction reports may then be sent to the satellite operator as a notification service.

In some examples, the collision probability thresholds and miss distance thresholds may be set to different values depending on the nature or identities of the current RSO and the known RSO. For example, alerts may be generated at lower collision probability threshold values and higher miss distance threshold values when one or both of the RSOs are satellites than when both RSOs are space debris objects.

In the first embodiment described above the conjunction search 18 carries out the altitude filter operation 19 first because this has a high rejection rate and requires only a few comparison operations. Accordingly, this may improve the computational efficiency of the overall conjunction search 18.

An algorithm according to a second embodiment, which may be used to process an ephemeris information message is set out below. This algorithm may be used to carry out the precomputing operation 12 and the conjunction search operation 17 of FIG. 2.

On New Ephemerides for object
  a. Build Catalog Entry for object
    i. Compute Altitude Descriptor
      1. find min/max altitude in new ephemerides
    ii. Compute Spatial Descriptor & Temporospatial Filter Indices
      1. For ephemeris in new ephemerides
        a. map ephemeris position onto unit sphere coordinates
        b. discretize unit sphere coordinates
        c. map discretized coordinates onto surface patches to consider
        d. add to the set of patches in the spatial filter
        e. add to the set of discretized times
    iii. Add Catalog Entry (Object Id+Descriptors) to Catalog
    iv. Remove Previous Catalog Entry for this object
  b. Screen for Conjunctions against Catalog
    i. For each Secondary object in the Catalog
      1. Evaluate screen_ephemerides function (see below)

Where the object corresponds to the current RSO of the first embodiment.

Algorithm pseudocode for the screen_ephemerides function is:

```
function screen_ephemerides(primary)
  for each secondary in catalog
    if not altitude_descriptor(primary, secondary)
      return False
    common_patches = spatial_descriptor(primary, secondary,
      common_patches)
    if common_patches.empty( ):
      return False
    time_intervals = temporospatial_descriptor(primary,
      secondary, common_patches)
    if time_intervals.empty( )
      return False
    foreach time_interval in time_intervals
      closest_approach = close_approach_search(primary, secondary,
        time_interval)
      if closest_appraoch.miss_distance < 100 km
        create_conjunction_alert(closest approach)
```

In the second embodiment each secondary in the catalog is a known RSO, and the primary is the current RSO.

The algorithm according to the second embodiment generates a conjunction alert for any conjunction where the current RSO and the known RSO have a closest approach distance of less than the screening distance of 100 km. This differs from the first embodiment of FIG. 2 where alerts are generated only after an additional collision probability operation 23 and probability and miss distance filtering operation 24.

In alternative examples the collision probability operation 23 and probability and miss distance filtering operation 24 could be omitted from the first embodiment or added to the second embodiment.

The use of precomputed descriptors stored in the catalog for the known RSOs enables fast evaluation of the collision risk. The evaluation of the collision risk of a current RSO against a known RSO recorded in the object catalogue using the precomputed descriptors can be carried out very quickly.

The use of the precomputed descriptors enables the system to screen an ephemeris of an RSO against the ephemerides of stored known RSO very quickly, in the order of seconds. In practice, the main constraint on speed of operation has been found to be the I/O time required to generate, store, and provide the conjunction reports. The system architecture scales roughly as O(N), so that it can easily scale to handle large numbers of known objects.

The speed and scalability of the system allows the system to provide an essentially real time service for screening an RSO against known RSOs. Real time or near real time conjunction screening services have not previously been possible.

The system is able to operate flexibly using ephemeris information from a wide range of data sources.

The above embodiments are able to provide an all-on-all near-realtime collision screening service wherein anytime an update to an objects ephemeris is obtained the system will screen that new ephemeris to find any close approaches that meet predetermined criteria, for example a specified probability of collision, a specified miss distance, or a specified Mahalanobis distance. The screening service is able to find close approaches within a specified screening radius, for example 100 km, for a desired time into the future, for example 7 days.

The embodiments may be able to reduce the computation required to track and collision screen a number of objects over time by very large amounts, such as multiple orders of magnitude. This is important in order to keep the collision screening computationally feasible because the number of RSO objects in orbit is very large. For example it is expected that in the near future hundreds of thousands of RSO objects in LEO will be tracked.

The embodiments can provide user customized reports by a range of different means.

The embodiments described above provide a collision warning system which carries out conjunction analysis and collision screening for real objects in orbit.

In a third embodiment the collision warning system 1 may be extended to operate on hypothetical objects. This is shown in FIG. 2 where a third ephemeris information message stream 10c is shown.

The ephemeris information message stream 10c comprises a series of hypothetical ephemeris information messages from satellite operators 4, or other clients, comprising hypothetical ephemeris information. The hypothetical ephemeris information may relate to real RSOs, for example describing a maneuver which is under consideration for a real satellite RSO, but has not yet been decided upon, or may relate to hypothetical RSOs, for example describing a possible orbit for a satellite RSO which has not been launched or had its orbit decided upon.

In operation of the orbital collision warning system 1 these hypothetical ephemeris information messages are treated in the same way as the ephemeris information messages received along the ephemeris information message streams 1a and 1b, with the following exceptions.

No record is generated and stored in the orbit catalog 16 regarding any hypothetical RSO described by a hypothetical ephemeris information message, because the hypothetical RSO described by a hypothetical ephemeris information message does not really exist, and so cannot be a collision hazard. Similarly, any record in the orbit catalog 16 regarding a real RSO for which a hypothetical ephemeris information message describes a hypothetical maneuver is not updated, because there is no certainty that the maneuver will be made. Accordingly, when the precomputed descriptors have been computed based on a hypothetical ephemeris information message these are not stored in the orbit catalog.

When a conjunction report is generated based on a hypothetical ephemeris information message this conjunction report is placed in a hypothetical conjunction report store 26, and not in the conjunction report store 25. The client or customer who provided the hypothetical ephemeris information message may be given access to their conjunction report in the hypothetical conjunction report store 26, for example by using an API.

The capability to process hypothetical ephemerides may be useful for a number of reasons. This may assist in planning satellite launches or maneuvers and satellite missions. Further, this may allow fine tuning of satellite operations by iterative changes of hypothetical actions until a best solution is found. This may, for example, be done by a satellite user/operator on a loop to optimize a scenario.

In the above embodiments three precalculated descriptors are used, an altitude descriptor, a spatial descriptor, and a temporospatial descriptor, in that order. This is not essential. In other examples the descriptors may be used in a different order. In other examples some of the descriptors may be omitted. In particular, in some examples the spatial descriptor alone may be used, or the spatial descriptor and temporospatial descriptor may be used without the altitude descriptor. In other examples different descriptors may be used instead of, or in addition to these three descriptors.

In the above embodiments a screening distance of 100 km is used at a number of points in the conjunction search 18. This is not essential. Different screening distances may be used in other examples, as appropriate in specific implementations.

In the above embodiments the precomputed descriptors are precomputed for a period of one day into the past and seven days into the future. This is not essential. Different periods may be used in other examples as appropriate to user requirements.

In the first embodiment, for each conjunction search 18, if the close approach filter operation 22 is passed, a collision probability operation 23 and a probability and miss distance filtering operation 24 are carried out. This is not essential. In other examples only one of the collision probability operation 23 and the probability and miss distance filtering operation 24 may be carried out.

Further, as is discussed above with reference to the second embodiment, in some examples both the collision probability operation 23 and the probability and miss distance filtering operation 24 may be omitted so that an alert is generated when the close approach filter operation is passed. In such examples conjunction alerts are generated for any conjunction where the current RSO and the known RSO have a closest approach distance of less than the screening distance, in the illustrated examples 100 km. This may be desired, for example, by some satellite operators, who may wish to be notified of close conjunctions and to assess the collision risk or other possible reasons for taking action themselves.

In some examples, if the close approach filter operation 22 is passed, an additional filtering operation may be carried out to determine whether an alert should be issued instead of the collision probability operation 23. In some examples this additional filtering operation may be a distance filtering operation comparing the closest approach between the current RSO and the known RSO to a predetermined threshold.

This threshold may be fixed, or may be based on the nature of the current RSO, for example having higher threshold distance value for a manned RSO than an unmanned RSO. In some examples the threshold may be compared to the Malahanobis distance. In some examples the threshold may be based upon the degree of covariance overlap between the RSOs. These different examples may alternatively or in combination.

In the above embodiments a conjunction search 18 is carried out for the RSO of the processed ephemeris information message and each of the other known RSOs serially. In other examples conjunction searches 18 may be carried out between the RSO of the processed ephemeris information message and multiple different other known RSOs in parallel. Such parallel processing is straightforward because the conjunction searches 18 relating to different ones of the known RSOs are independent of one another.

In the above embodiments the orbital collision warning system operates for RSO in earth orbit. In other examples the orbital collision warning system may operate for RSO in orbit around other bodies.

In the above embodiments a record for the current RSO in the orbit catalog is added or updated, as appropriate, before the conjunction search operation is carried out. This is not essential. In other examples the record could be added or updated at any convenient time. 19110548-1

In the first embodiment ephemeris information is received from a single ground radar station. This is not essential. In other examples, more radar stations may be used. In some examples radar stations which are not ground based may be used. In some examples other types of sensor may be used.

In the first embodiment ephemeris information is received from two satellite operators. This is not essential. In other examples, more satellite operators may be used. In some examples there may be a large number of satellite operators. In other examples there may be no satellite operators, so that all ephemeris information is received from other sources.

In the above embodiments the collision warning system is an orbital collision warning system operating for space objects. In other examples the collision warning system may operate for other types of objects moving on predictable paths.

In the above embodiments the telecommunications network is the Internet. In alternative examples other telecommunications networks may be used in addition to, or instead of, the Internet.

In the above embodiments some functionality may be provided by software. In other examples this functionality may be provided wholly or in part in hardware, for example by dedicated electronic circuits.

In the above embodiments the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Computer programs and computer executable instructions may be provided using any computer-readable media that is accessible by computing based device. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Although the system is shown as a single device it will be appreciated that this system may be distributed or located remotely and accessed via a network or other communication link (e.g. using a communication interface).

In the illustrated embodiments the system is located on the ground. In other examples the system may be located on a spacecraft, such as a satellite, or may be distributed across multiple spacecraft, such as satellites.

The illustrated embodiments receive ephemeris information from a ground based radar station. In other examples ephemeris information may be received from one or multiple non-radar sensors in addition or alternative to one or multiple radar sensors, The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiments is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer implemented method comprising:
   obtaining, by at least one processor, trajectory information of a plurality of objects moving on orbits;
   for each one of the plurality of objects, based upon respective trajectory information of the one of the plurality of objects, computing, by the at least one processor, a respective spatial descriptor of the orbit of the one of the plurality of objects;
   storing, by the at least one processor, the respective spatial descriptors of each of the plurality of objects in a data structure in a memory; and
   subsequently:
   obtaining, by the at least one processor from one or more radars, trajectory information of a further object;
   based upon the trajectory information of the further object, computing, by the at least one processor, a spatial descriptor of the orbit of the further object;
   comparing, by the at least one processor, the spatial descriptor of the further object against the respective spatial descriptors of each of the plurality of objects stored in the data structure stored in memory to generate first comparisons to determine whether each of these first comparisons indicates a possible collision risk; and
   based upon each of the first comparisons:
   determining, by the at least one processor based on the first comparison indicating a possible collision risk, a result of a close approach determination between the respective trajectory information of the respective one of the plurality of objects and the trajectory information of the further object; and
   taking an action, by the at least one processor, based on result of the close approach determination satisfying a predetermined threshold,
   wherein the spatial descriptor of the orbit of an object is a dimensionally reduced descriptor of the orbit of the object.

2. The computer implemented method according to claim 1, and further comprising, based upon each of the first comparisons not indicating a possible collision risk, taking no action.

3. The computer implemented method according to claim 1, wherein the trajectory information comprises time, position and velocity information describing the trajectory of a respective object.

4. The computer implemented method according to claim 3, wherein the trajectory information further comprises uncertainty information regarding the trajectory of the object.

5. The computer implemented method according to claim 1, wherein the trajectory information comprises at least one ephemeris of a respective object.

6. The computer implemented method according to claim 1, wherein computing the spatial descriptor of an object comprises:
using, by the at least one processor, the trajectory information of the object to calculate the orbit of the object; and
mapping, by the at least one processor, the orbit of the object onto a surface of a sphere.

7. The computer implemented method according to claim 6, wherein the orbit of the object is defined in Cartesian coordinates, and preferably as discrete Cartesian coordinates.

8. The computer implemented method according to claim 6, wherein the orbit of the object is defined in spherical coordinates.

9. The computer implemented method according to claim 6, wherein mapping the orbit of the object onto the surface of the sphere comprises:
mapping, by the at least one processor, the orbit of the object onto patches on the surface of the sphere.

10. The computer implemented method according to claim 9, wherein the patches are patches of a Voronoi diagram.

11. The computer implemented method according to claim 9, wherein the patches are substantially equal in size.

12. The computer implemented method according to claim 9, wherein computing the spatial descriptor of the object further comprises:
identifying, by the at least one processor, patches wholly or partially within a predetermined distance of the mapped orbit of the object on the surface of the sphere;
wherein the spatial descriptor comprises a set of identified patches.

13. The computer implemented method according to claim 12, wherein making the first comparison of the spatial descriptor of the further object against the respective spatial descriptor of one of the plurality of objects comprises comparing the respective sets of identified patches of the spatial descriptors to identify whether the respective sets of identified patches have patches in common; and
determining, by the at least one processor, that the comparison indicates a possible collision risk if the respective sets of identified patches have one or more patches in common.

14. The computer implemented method according to claim 13, wherein the comparison is a set intersection comparison.

15. The computer implemented method according to claim 1, wherein the method further comprises:
for each one of the plurality of objects, based upon respective trajectory information of the one of the plurality of objects, computing, by the at least one processor, a respective temporospatial descriptor of the orbit of the one of the plurality of objects;
storing, by the at least one processor in the memory, the respective temporospatial descriptors of each of the plurality of objects in a data structure; and
subsequently:
based upon the trajectory information of the further object, computing, by the at least one processor, a spatial descriptor of the orbit of the further object; and
for each of the first comparisons which indicates a possible collision risk;
making, by the at least one processor, a second comparison of the temporospatial descriptor of the further object against the respective temporospatial descriptor of the respective one of the plurality of objects stored in the data structure to determine whether the second comparison indicates a possible collision risk; and
based upon the second comparison:
determining, by the at least one processor based on the second comparison indicating a possible collision risk, a result of a close approach determination between the respective trajectory information of the respective one of the plurality of objects and the trajectory information of the further object; and
taking an action, by the at least one processor, based on result of the close approach determination satisfying a predetermined threshold.

16. The computer implemented method of claim 15, and further comprising, based upon the second comparison not indicating a possible collision risk, taking no action.

17. The computer implemented method according to claim 15, wherein the temporospatial descriptor of the orbit of an object is a dimensionally reduced descriptor of movement of the object along the orbit.

18. The computer implemented method according to claim 15, wherein the temporospatial descriptor comprises a set of identified patches of the spatial descriptor together with time data identifying times at which the object passes along a mapped orbit within a predetermined distance of each patch.

19. The computer implemented method according to claim 18, wherein making the second comparison of the temporospatial descriptor of the further object against the respective temporospatial descriptor of the respective one of the plurality of objects comprises using a set intersection algorithm to identify any time ranges during which both of the further object and the respective one of the plurality of objects are within the predetermined distance of the same patch; and
determining, by the at least one processor, that the comparison indicates a possible collision risk if any time ranges are identified during which both of the further object and the respective one of the plurality of objects are within the predetermined distance of the same patch.

20. The computer implemented method according to claim 19, wherein the close approach determination between the respective trajectory information of the respective one of the plurality of objects and the trajectory information of the further object is carried out only for identified time ranges.

21. The method according to claim 1, and further comprising:
for each one of the plurality of objects, based upon respective trajectory information of the one of the plurality of objects, computing, by the at least one processor, a respective altitude descriptor of the orbit of the one of the plurality of objects; and
storing, by the at least one processor in the memory, the respective altitude descriptors of each of the plurality of objects in the data structure; and
subsequently:
based upon the trajectory information of the further object, computing, by the at least one processor, an altitude descriptor of the orbit of the further object;
making, by the at least one processor, additional comparisons of the altitude descriptor of the further object against the respective altitude descriptors of each of the plurality of objects stored in the data structure to determine whether each of these additional comparisons indicates a possible collision risk; and based upon each of the additional comparisons:

determining, by the at least one processor based on the additional comparison indicating a possible collision risk, a result of a close approach determination between the respective trajectory information of the respective one of the plurality of objects and the trajectory information of the further object; and taking, by the at least one processor, an action based on result of the close approach determination satisfying a predetermined threshold.

22. The computer implemented method of claim 21, and further comprising, based upon each of the additional comparisons, taking no action when the additional comparison does not indicate a possible collision risk.

23. The computer implemented method according to claim 21, wherein the altitude descriptor of the orbit of an object is a dimensionally reduced descriptor of the orbit of the object.

24. The computer implemented method of claim 21, wherein the altitude descriptor of the orbit of an object comprises the highest altitude value and the lowest altitude value of the orbit.

25. The computer implemented method of claim 24, wherein making the additional comparison of the altitude descriptor of the further object against the respective altitude descriptor of one of the plurality of objects comprises comparing the highest altitude value of each altitude descriptor to the lowest altitude value of the other altitude descriptor to identify whether the compared values are separated by less than a predetermined value; and determining, by the at least one processor, that the additional comparison indicates a possible collision risk when either of the compared values are separated by less than the predetermined value.

26. The computer implemented method according to claim 21, wherein the additional comparisons are made before the first comparisons, and the first comparisons are only made if the additional comparisons indicate a possible collision risk.

27. The computer implemented method according to claim 1, wherein the objects are space objects.

28. The computer implemented method according to claim 1, and further comprising, determining, by the at least one processor based on whether the results of the close approach determination satisfy the predetermined threshold, one or more of: a collision probability, a distance of closest approach, and/or a time of closest approach, between the respective one of the plurality of objects and the further object based on the respective trajectory information of the respective one of the plurality of objects and the further object.

29. The computer implemented method according to claim 27, wherein the objects are Resident Space Objects (RSOs).

30. The computer implemented method according to claim 27, wherein the further object is a satellite.

31. The computer implemented method according to claim 1, wherein the further trajectory information of the further object is hypothetical trajectory information.

32. The computer implemented method according to claim 31, wherein the further object is hypothetical.

33. The computer implemented method according to claim 31, wherein the method is repeated for different hypothetical trajectory information in order to determine an optimal trajectory.

34. The computer implemented method according to claim 1, wherein the close approach determination comprises one or more of:

calculating, by the at least one processor, a minimum separation distance between the respective one of the plurality of objects and the further object and comparing the calculated minimum separation distance to a threshold; and calculating, by the at least one processor, a probability of a collision between the respective one of the plurality of objects and the further object and comparing the probability of a collision to a threshold.

35. The computer implemented method according to claim 34, wherein the computer implemented method is performed on a cloud based distributed system.

36. The computer implemented method according to claim 1, wherein the computer implemented method is performed on a distributed system.

37. The computer implemented method according to claim 1, wherein the computer implemented method is performed on one or more satellites.

38. A system comprising:

a memory having computer executable instructions therein; and at least one processor, the computer executable instructions, when executed by the at least one processor, cause the one or more processors to:

obtain, from one or more radars, trajectory information of a plurality of objects moving on orbits;

for each one of the plurality of objects, based upon respective trajectory information of the one of the plurality of objects, compute a respective spatial descriptor of the orbit of the one of the plurality of objects;

store the respective spatial descriptors of each of the plurality of objects in a data structure; and subsequently:

obtain trajectory information of a further object;

based upon the trajectory information of the further object, compute a spatial descriptor of the orbit of the further object;

making first comparisons of the spatial descriptor of the further object against the respective spatial descriptors of each of the plurality of objects stored in the data structure to determine whether each of these first comparisons indicates a possible collision risk; and based upon each of the first comparisons:

if the first comparison indicates a possible collision risk, determine a result of a close approach determination between the respective trajectory information of the respective one of the plurality of objects and the trajectory information of the further object; and take an action based on result of the close approach determination satisfying a predetermined threshold, wherein the spatial descriptor of the orbit of an object is a dimensionally reduced descriptor of the orbit of the object.

39. A tangible non-transitory computer-readable storage medium having computer readable instructions stored therein which, when executed by at least one processor, cause the at least one processor to:

obtain trajectory information of a plurality of objects moving on orbits;

for each one of the plurality of objects, based upon respective trajectory information of the one of the plurality of objects, compute a respective spatial descriptor of the orbit of the one of the plurality of objects;
store the respective spatial descriptors of each of the plurality of objects in a data structure; and
subsequently:
obtain trajectory information of a further object;
based upon the trajectory information of the further object, compute a spatial descriptor of the orbit of the further object;
making first comparisons of the spatial descriptor of the further object against the respective spatial descriptors of each of the plurality of objects stored in the data structure to determine whether each of these first comparisons indicates a possible collision risk; and
based upon each of the first comparisons:
if the first comparison indicates a possible collision risk, determine a result of a close approach determination between the respective trajectory information of the respective one of the plurality of objects and the trajectory information of the further object; and
take an action based on result of the close approach determination satisfying a predetermined threshold,
wherein the spatial descriptor of the orbit of an object is a dimensionally reduced descriptor of the orbit of the object.

* * * * *